United States Patent
Lee et al.

(10) Patent No.: US 7,925,058 B2
(45) Date of Patent: Apr. 12, 2011

(54) IRIS RECOGNITION SYSTEM AND METHOD USING MULTIFOCUS IMAGE SEQUENCE

(75) Inventors: Yillbyung Lee, Seoul (KR); Byungjun Son, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 1098 days.

(21) Appl. No.: 11/704,223

(22) Filed: Feb. 9, 2007

(65) Prior Publication Data

US 2008/0037835 A1 Feb. 14, 2008

(30) Foreign Application Priority Data

Jun. 2, 2006 (KR) ........................ 10-2006-0049765

(51) Int. Cl.
G06K 9/00 (2006.01)
G06K 9/46 (2006.01)
(52) U.S. Cl. ........................ 382/117; 382/190
(58) Field of Classification Search ........................ None
See application file for complete search history.

(56) References Cited

U.S. PATENT DOCUMENTS

| | | | | |
|---|---|---|---|---|
| 5,434,955 | A * | 7/1995 | Kumamoto | 706/52 |
| 5,978,494 | A * | 11/1999 | Zhang | 382/117 |
| 7,031,523 | B2 * | 4/2006 | Comaniciu et al. | 382/190 |
| 7,382,901 | B2 * | 6/2008 | Wakamori | 382/117 |
| 7,593,550 | B2 * | 9/2009 | Hamza | 382/117 |

OTHER PUBLICATIONS

Chen et al. (Jun. 2000) "A new LDA-based face recognition system which can solve the small sample size problem." Pattern Recognition vol. 33 No. 10, pp. 1713-1726.*
Liu et al. (Aug. 2006) "Iris recognition based on DLDA." Proc. 18th Int'l Conf. on Pattern Recognition, vol. 4 pp. 489-492.*
Lu et al. (Jan. 2003) "Face recognition using LDA based algorithms." IEEE Trans. on Neural Networks, vol. 14 No. 1, pp. 195-200.*
Son et al. (Apr. 2007) "DLDA-based iris recognition from image sequences with various focus information." Proc. 7th WSEAS Int'l Conf. on Multimedia Systems and Signal Processing, pp. 94-101.*
Tao et al. (May 2004) "A direct method to solve the biased discriminant analysis in kernel feature space for content based image retrieval." Proc. IEEE Int'l Conf. on Acoustics, Speech, and Signal Processing, vol. 3, pp. 441-444.*
Yang et al. (Dec. 2000) "An efficient LDA algorithm for face recognition." Proc. 6th Int'l Conf. on Control, Automation, Robotics, and Vision.*
Yu et al. (Oct. 2001) "A direct LDA algorithm for high-dimensional data with application to face recognition." Pattern Recognition vol. 34 No. 10, pp. 2067-2070.*

* cited by examiner

*Primary Examiner* — Brian P Werner
*Assistant Examiner* — Barry Drennan

(57) ABSTRACT

An iris recognition system includes an eye image input unit calculating the distance between an image obtaining apparatus and a user using a distance sensor. An eye image pretreatment unit calculates a fuzzy entropy for the multifocus eye image sequence input. A feature vector extraction unit multi-divides the multifocus iris image sequence extracted in the eye image pretreatment unit. A recognition unit discriminates the user's authenticity by measuring a dissimilarity between the feature vector extracted from the feature vector extraction unit and a feature vector already registered. A register unit registers the reduced wavelet feature vector extracted from the feature vector extraction unit and the dimension-reducing transform function P in a storage unit. A storage unit stores the dimension-reducing transform function P and the reduced wavelet feature vector.

7 Claims, 10 Drawing Sheets

IRIS RECOGNITION SYSTEM AND METHOD USING MULTIFOCUS IMAGE SEQUENCE

CROSS-REFERENCE TO RELATED APPLICATION

This application claims the benefit of Korean Patent Application No. 10-2006-0049765, filed on Jun. 2, 2006, the entire disclosure of which is hereby incorporated by reference.

BACKGROUND OF THE INVENTION

1. Field of the Invention

The present invention relates to an iris recognition system and method and, more particularly, to an iris recognition system and method using a multifocus image sequence that can reduce the time required for obtaining eye images since the eye images of various levels are obtained in sequence from an image obtaining apparatus by changing focuses at regular time intervals within a predetermined distance when receiving an eye image of a user. Moreover, the iris recognition system and method using a multifocus image sequence of the present invention can recognize not only well focused images but also poorly focused images since eye images that can well reflect focus changes are selected and utilized using a fuzzy entropy.

2. Description of Related Art

In general, in order to identify users based on the users' biological characteristics, fingerprints, faces, irises, palm prints and the like have been utilized. It has been known that the irises provide an excellent personal identification performance and thereby show a security performance higher than the other biological information.

A conventional iris recognition system is designed to obtain only high quality images in a process of receiving users' eye images from a camera to enhance the personal identification performance and the security performance.

However, the conventional iris recognition system has disadvantages in that the time for adjusting a focus to obtain a well focused iris image is required too much when inputting an eye image and a user is forced to meet his or her eye in an accurate position through voice messages, thus causing considerable inconvenience to the user.

Moreover, the conventional iris recognition system has further disadvantages in that, if an eye image that is not well focused by the user's movement is input, it cannot correctly identify the user. In such a case, the user should have his/her eye image photographed again and wait until an recognition process is finished, thus increasing the total processing time of the iris recognition system, deteriorating the recognition rate and increasing the inconvenience.

Furthermore, the conventional iris recognition technique utilizes an iris area existing between pupil and sclera and uses a method for extracting an area between an inner boundary corresponding to a boundary of the pupil and the iris and an outer boundary of the pupil and the sclera to extract such an iris area between the pupil and the sclera.

The conventional method for extracting such an iris area has a disadvantage in that, due to a difference in the color tone between the pupil and the iris, the inner boundary can be easily located, whereas, the outer boundary is hardly found out.

In addition, the iris area extracted in such a manner includes a considerable amount of an unnecessary area where iris patterns barely appear as well as an area including various iris patterns that are useful for the personal identification. Accordingly, such an unnecessary area may have a bad influence in forming an iris code or an iris feature vector that is used in the recognition process.

Furthermore, in the field of the conventional iris recognition technique, a method for forming a binary iris code using Gabor transform or wavelet transform, or a method for forming a feature vector using a statistic value has been mainly used to extract the features of irises.

In the case where the Gabor transform or the wavelet transform is used for generating a binary iris code, if a captured image is seriously blurred, the recognition may be unavailable. Moreover, a feature vector formed using a statistic value of a subband having only high-frequency components among the subbands multi-divided by conventional Harr wavelet transform and Daubechies wavelet transform is sensitive to noise images and further has a low efficiency from a practical point of view in forming a low dimensional feature vector.

Accordingly, it is necessary to provide a technique that can efficiently process, store, transmit and search the pattern information that is less affected by an iris image quality in an iris recognition system.

SUMMARY OF THE INVENTION

Accordingly, an object of the present invention is to provide an iris recognition system and method using a multifocus image sequence that can effectively recognize low-resolution images and poorly focused images as well as high-resolution images and well focused images. Moreover, another object of the present invention is to provide an iris recognition system and method using a multifocus image sequence that can extract the feature vector having a high discrimination performance, enhance the efficiency of a storage device by effectively reducing the dimension of the feature vector, and minimize recognition errors even using a simple recognition apparatus using a wavelet analysis and a direct linear discriminant analysis (DLDA).

To accomplish the above objects, the present invention provides an iris recognition system using a multifocus image sequence comprising: an eye image input unit calculating the distance between an image obtaining apparatus and a user using a distance sensor to receive a multifocus eye image sequence having focus information of the user's eye varied at regular time intervals within a predetermined distance using the image obtaining apparatus; an eye image pretreatment unit calculating a fuzzy entropy for the multifocus eye image sequence input from the eye image input unit to select eye images of N number that can effectively express eye image data of various focusing levels, and extracting a multifocus iris image sequence by separating an iris image between pupil and collarette that has various iris patterns, from which an area unnecessary for configuring a feature vector is removed, from the selected eye images; a feature vector extraction unit multi-dividing the multifocus iris image sequence extracted in the eye image pretreatment unit, forming a wavelet feature vector from the multi-divided images using a subband including only a low-frequency area, and generating a wavelet feature vector reduced to a dimension having a high discrimination performance and a dimension-reducing transform function P; a recognition unit discriminating the user's authenticity by measuring a dissimilarity between the feature vector extracted from the feature vector extraction unit and a feature vector already registered; a register unit registering the reduced wavelet feature vector extracted from the feature vector extraction unit and the dimension-reducing transform function P in a storage unit; and a storage unit storing the dimension-reducing transform function P and the reduced wavelet feature vector.

Moreover, an iris recognition method using a multifocus image sequence in accordance with the present invention comprises: an image obtaining step (S200) of receiving a multifocus eye image sequence from an image obtaining apparatus; a pretreatment step (S300) of calculating a fuzzy entropy from the multifocus eye image sequence obtained from the image obtaining step (S200) to select eye images and extracting a multifocus iris image sequence by separating an iris image between pupil and collarette from the selected eye images; a feature vector extraction step (S400) of multi-dividing the multifocus iris image sequence extracted in the pretreatment step (S300), forming a wavelet feature vector from a subband including only low-frequency components among the multi-divided subbands, and extracting a reduced wavelet feature vector of an iris area for the personal identification from the wavelet feature vector thus formed using a dimension-reducing transform function P stored in a storage unit; and a recognition step (S500) of discriminating a user's authenticity by measuring a dissimilarity between the wavelet feature vector extracted in the feature vector extraction step (S400) and the feature vector registered in the storage unit.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Hereinafter, an iris recognition system and method using a multifocus image focus in accordance with the present invention will be described in detail with reference to the accompanying drawings.

Figure 1:
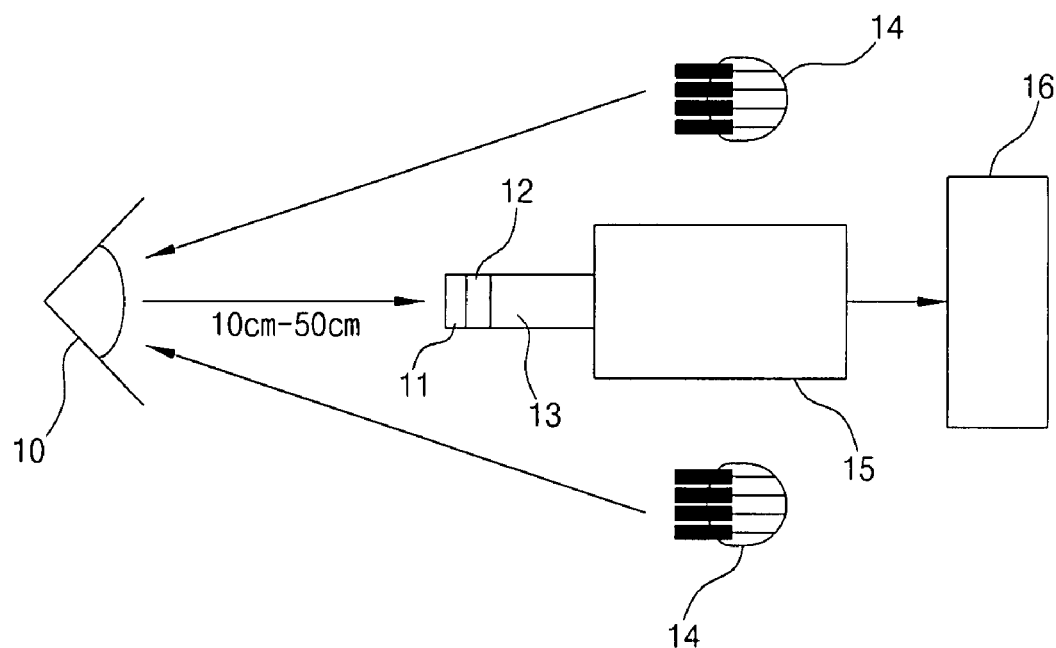
FIG. 1 is a diagram illustrating an image obtaining apparatus for the iris recognition in accordance with the present invention.

FIG. 1 is a diagram illustrating an image obtaining apparatus in an iris recognition system using a multifocus image sequence in accordance with the present invention.

As depicted in the figure, the image obtaining apparatus in the iris recognition system comprises an infrared transmission filter 11, a macro lens 12, a camera lens 13, infrared light units 14, a CCD camera 15 and a frame grabber 16.

A user's eye 10 is photographed by the CCD camera 15 through the infrared transmission filter 11, the macro lens 12 and the camera lens 13 in a state where a light is thrown from the infrared light units. Analog signals of the photographed eye image is converted into digital signals by the frame grabber 16 connected with the CCD camera 15.

Here, since an iris area occupies very small space in the eye image, it is impossible to photograph an image having a recognizable iris pattern only using the camera lens 13 mounted in the ordinary CCD camera 15. Accordingly, if an eye image is photographed using the camera lens 13 mounted in the CCD camera 15, noise images that make it difficult to distinguish the iris pattern are created in the photographed eye image as things placed in front of the eye and the light used indoors are reflected from the cornea.

Accordingly, the infrared transmission filter 11 and the macro lens 12 are attached in front of the camera lens 13 to ensure a recognizable iris pattern and to avoid losing iris image data due to the noise images.

Moreover, the infrared light unit 14 composed an infrared light emitting diode (LED) irradiates light toward the front of the CCD camera 15.

In order to photograph an eye image having a recognizable iris pattern, the infrared light units 14 is composed of a near infrared LED having a maximum wavelength of 780 nm.

Here, the infrared light units 14 are positioned at the left and light sides of the CCD camera 15, and the gradient of the infrared light units 14 is adjusted to focus the reflected light of the infrared light units 14 on the inside of the cornea so as not to cause a loss of the iris data as the iris pattern is shielded by the reflected light, regardless of whether a user is wearing eye glasses or contact lenses.

As such, the loss of the eye image data can be minimized by irradiating the infrared light from the infrared light units 14 and, at the same time, installing the infrared transmission filter 11 and the macro lens 12 in front of the CCD camera 15 to photograph the eye image.

Meanwhile, it is desirable that the infrared transmission filter 11 should be configured to intercept the visible light less than 650 nm.

Figure 2:
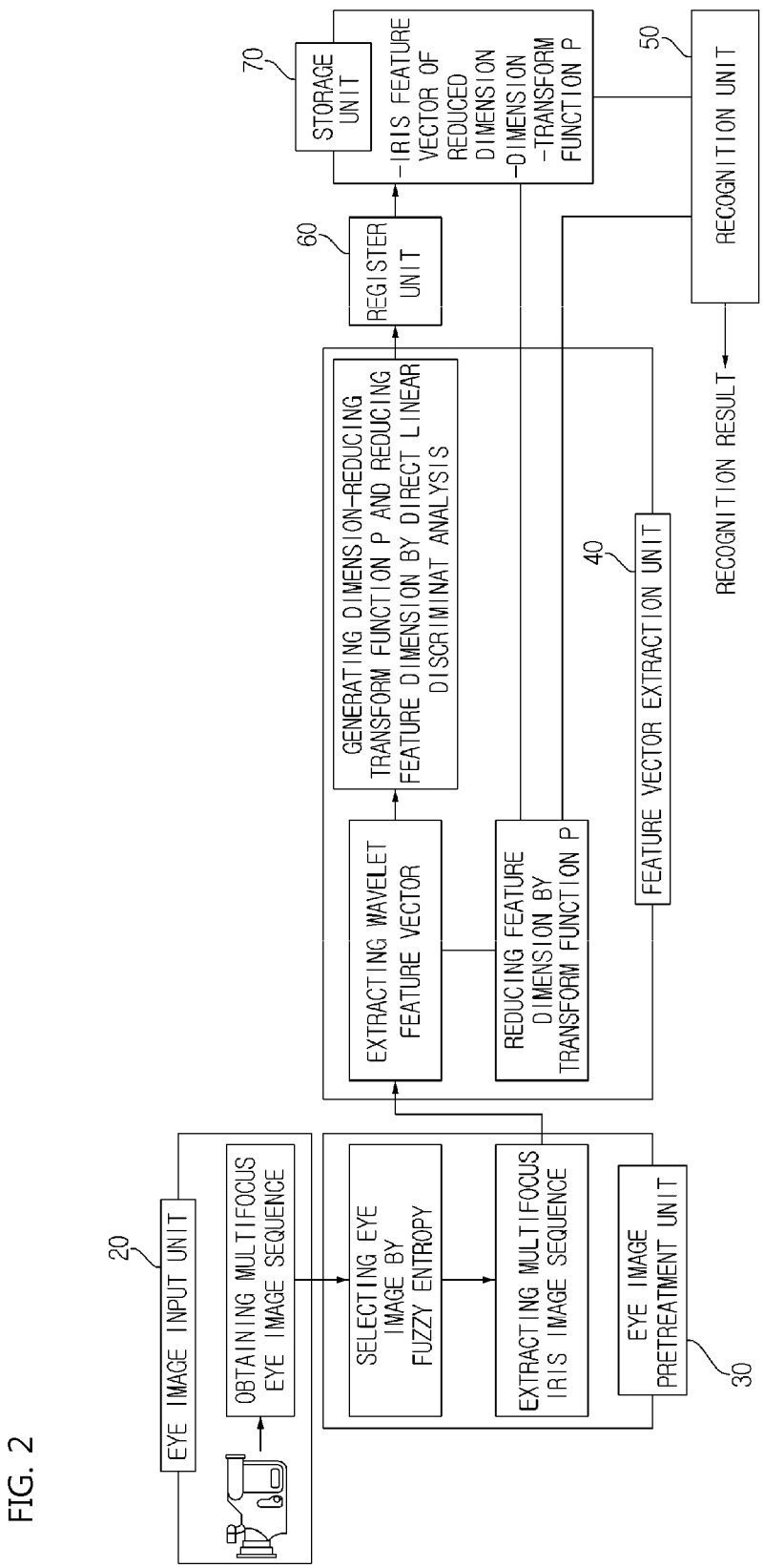
FIG. 2 is a diagram illustrating an iris recognition system using a multifocus image sequence in accordance with the present invention.

FIG. 2 is a hardware block diagram illustrating an iris recognition system using a multifocus image sequence to which a method of inputting an iris image for the personal identification, processing, registering and recognizing the input image in accordance with the present invention is applied.

As depicted in the figure, the iris recognition system in accordance with the present invention comprises an eye image input unit 20, an eye image pretreatment unit 30, a feature vector extraction unit 40, a recognition unit 50, a register unit 60 and a storage unit 70 for storing a feature vector and a dimension-reducing transform function.

The eye image input unit 20 calculates the distance between the image obtaining apparatus and the user using a distance sensor and receives a multifocus eye image sequence having the focus information of the user's eye 10 varied at regular time intervals within a predetermined distance using the image obtaining apparatus of FIG. 1.

The eye image pretreatment unit 30 calculates a fuzzy entropy for the multifocus eye image sequence input from the eye image input unit 20 to select eye images of N number that can effectively express the eye image data of various focusing levels. Subsequently, the eye image pretreatment unit 30 extracts a multifocus iris image sequence by separating an iris image between the pupil and the collarette that has various iris patterns, from which an area unnecessary for configuring a feature vector is removed, from the selected eye images using a Canny edge detection method, a bisection method and a discrete Fourier transform.

The feature vector extraction unit 40 multi-divides the multifocus iris image sequence extracted in the eye image pretreatment unit 30 using a biorthogonal wavelet transform, forms a wavelet feature vector from the multi-divided images using a subband including only a low-frequency area, and generates a reduced wavelet feature vector and a dimension-reducing transform function P using a direct linear discriminant analysis.

The recognition unit 50 compares the feature vector extracted from the feature vector extraction unit 40 with a feature vector registered in the storage unit 70 to perform the recognition.

Here, the feature vector used in the recognition unit 50 is the same until the process of extracting the wavelet feature vector and the dimension-reducing transform function P stored in the storage unit 70 is used to extract the reduced wavelet feature vector of the iris area.

The register unit 60 registers the reduced wavelet feature vector extracted from the feature vector extraction unit 40 and the dimension-reducing transform function P in the storage unit 70.

The present invention registers a user's eye image 10 using a multifocus image sequence and recognizes the user's eye image 10 only using a single focus image, thus providing an effect of reducing the processing time of the whole system, not deteriorating the recognition rate.

Moreover, the iris recognition system configured as described above can recognize not only well focused images but also poorly focused images input for the recognition.

Figure 3:
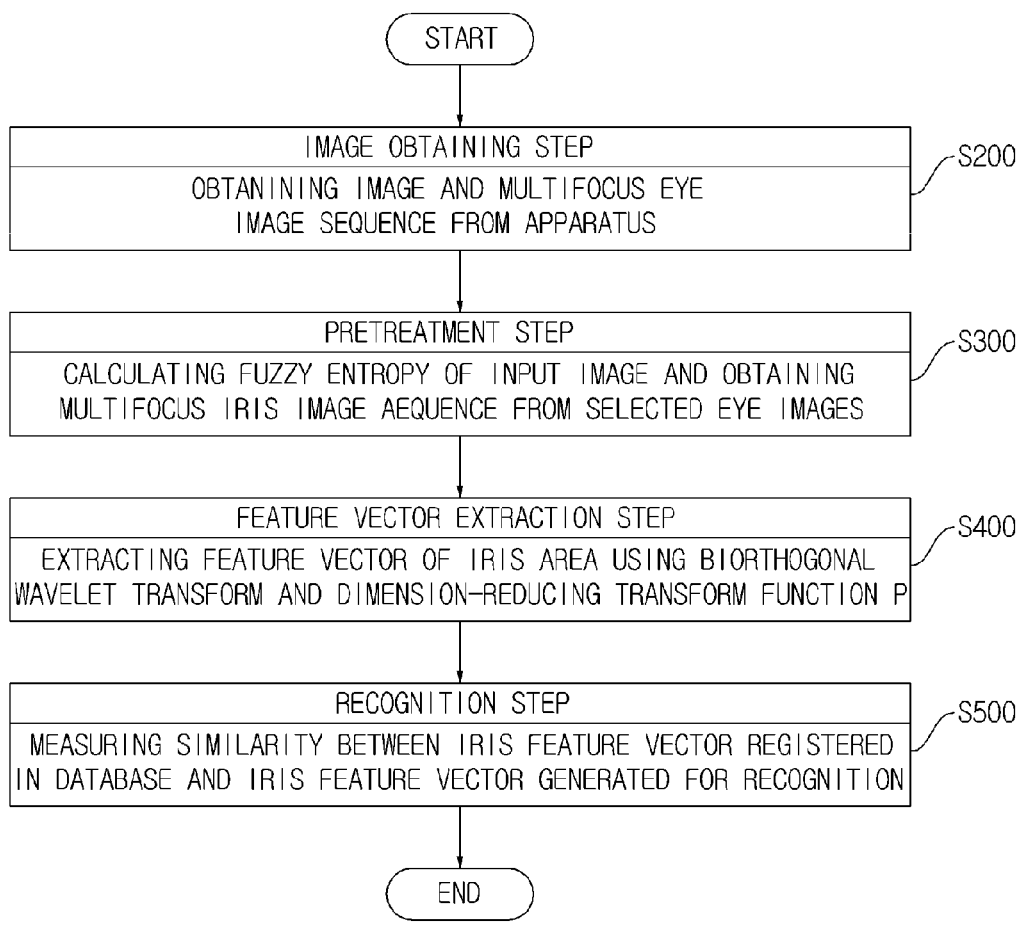
FIG. 3 is a flowchart illustrating a method for obtaining, processing and recognizing an iris image for the personal identification in the iris recognition system using a multifocus image sequence in accordance with the present invention.

FIG. 3 is a flowchart illustrating a method for obtaining, processing and recognizing an iris image for the personal identification in accordance with the present invention.

As depicted in the figure, the method for obtaining, processing and recognizing an iris image for the personal identification in accordance with the present invention comprises: an image obtaining step (S200) of receiving a multifocus eye image sequence from the image obtaining apparatus; a pretreatment step (S300) of calculating a fuzzy entropy from the multifocus eye image sequence obtained from the image obtaining step (S200) to select eye images and extracting a multifocus iris image sequence by separating an iris image between the pupil and the collarette from the selected eye images using a Canny edge detection method, a bisection method and a discrete Fourier transform; a feature vector extraction step (S400) of multi-dividing the multifocus iris image sequence extracted in the pretreatment step (S300) using a biorthogonal wavelet transform, forming a wavelet feature vector from a subband including only a low-frequency area among the multi-divided subbands, and extracting a reduced wavelet feature vector of an iris area for the personal identification from the wavelet feature vector using a dimension-reducing transform function P stored in the storage unit 70; and a recognition step (S500) of discriminating the user's authenticity by measuring the dissimilarity between the wavelet feature vector extracted in the feature vector extraction step (S400) and the feature vector registered in the storage unit 70.

Figure 4:
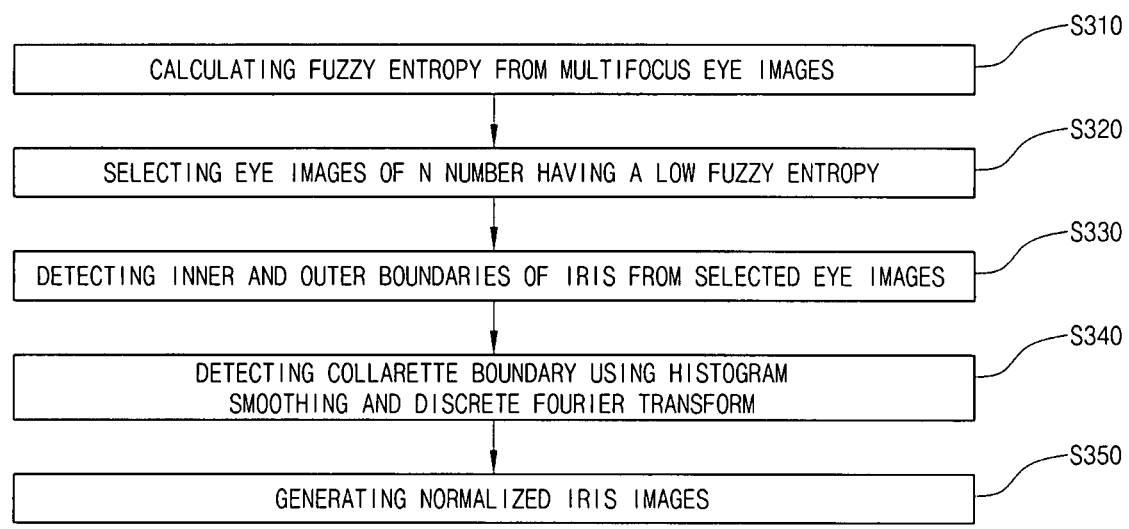
FIG. 4 is a flowchart illustrating an image pretreatment process in accordance with the present invention.
Figure 5:
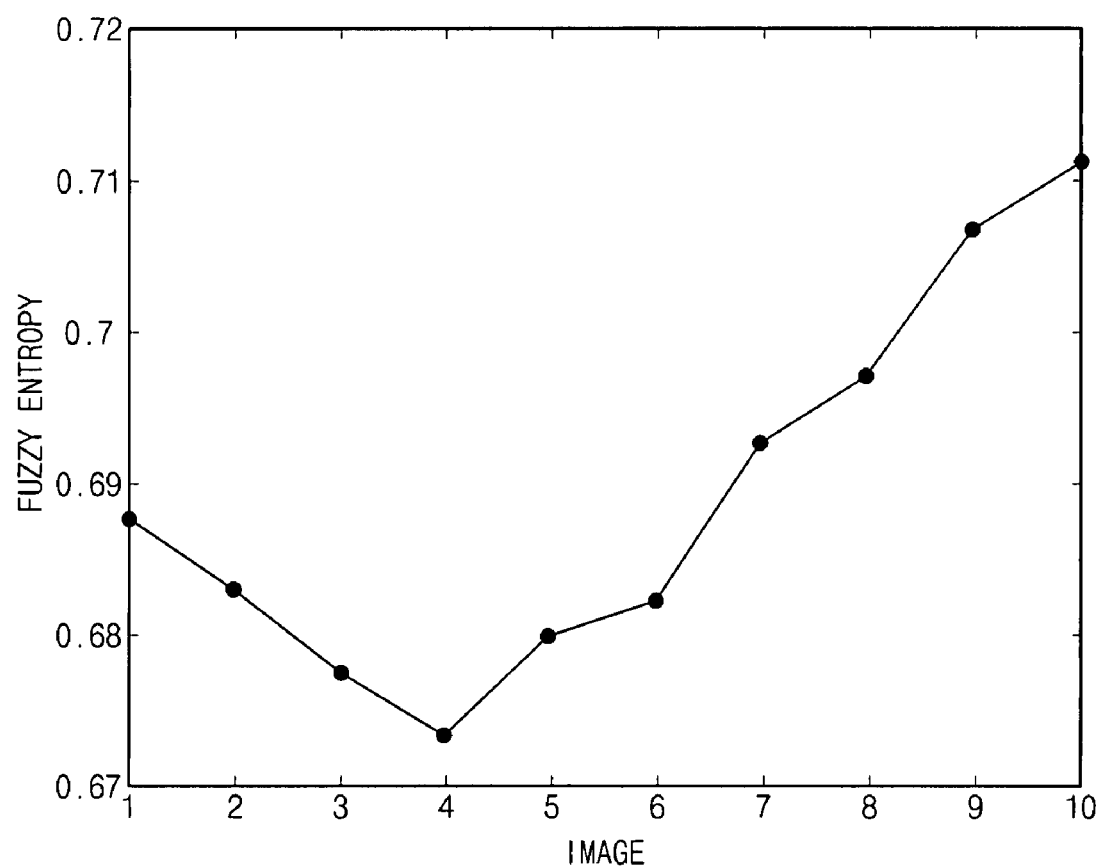
FIG. 5 is a graph illustrating fuzzy entropy values calculated to select images in the image pretreatment process in accordance with the present invention.
Figure 6:
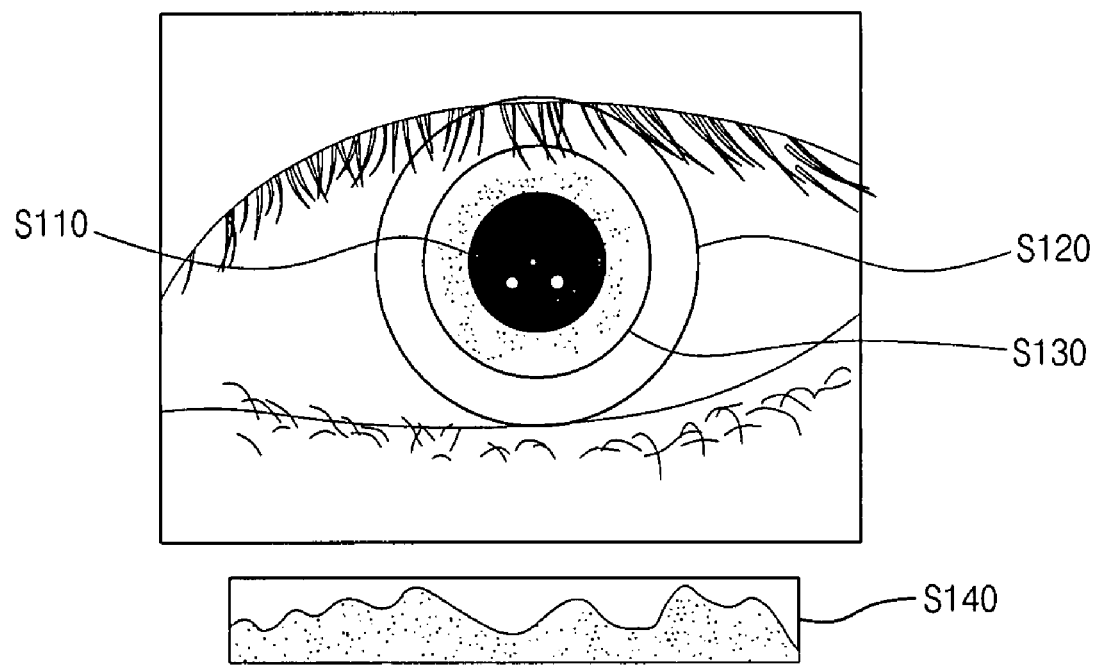
FIG. 6 is a photograph showing an inner boundary, an outer boundary, a collarette boundary and a normalized iris detected in the image pretreatment process.

FIG. 4 is a flowchart illustrating the image pretreatment process in accordance with the present invention, FIG. 5 is a graph illustrating fuzzy entropy values calculated to select images in the image pretreatment process, and FIG. 6 is a photograph showing an inner boundary, an outer boundary, a collarette boundary and a normalized iris detected from the eye images selected in the image pretreatment process.

As depicted in the figures, the image pretreatment step (S300) comprises: a step (S310) of calculating a fuzzy entropy value from the multifocus eye image sequence obtained in the image obtaining step (S200); a step (S320) of selecting eye images of N number having a low fuzzy entropy value based on the calculated fuzzy entropy; a step (S330) of detecting an inner boundary S110 and an outer boundary S120 of an iris from the selected eye images using a Canny edge detection method and a bisection method; a step (S340) of detecting a collarette boundary S130 from the iris area between the inner boundary S110 and the outer boundary S120 of the detected iris using a histogram smoothing and a discrete Fourier transform; and a step (S350) of generating a normalized iris image S140 for the iris area corresponding to the detected inner boundary S110 and the collarette boundary S130.

As described above, in order to select (S320) the eye images of N number that can well reflect focus changes of the eye images of the user using a fuzzy entropy value calculated (S310) from the multifocus eye image sequence obtained in the image obtaining step (S200) taking the processing speed of the system into consideration, the fuzzy entropy value is calculated using the following formula 1:

$$E(I) = \frac{1}{LM} \sum_{i=1}^{L} \sum_{j=1}^{M} S(n(i, j)) \qquad \text{[Formula 1]}$$

wherein E(I) denotes a fuzzy entropy value of an eye image (I), L and M denote sizes of column and row of the eye image (I), respectively, n(i,j) denotes a normalized pixel value, and s denotes a Shannon's entropy function that is defined as the following formula 2:

$$S(\alpha) = -(\alpha)\log_2(\alpha) - (1-\alpha)\log_2(1-\alpha) \qquad \text{[Formula 2]}$$

Eye images of N number having a low fuzzy entropy value is selected from the fuzzy entropy values calculated from the eye images.

FIG. 5 is a graph illustrating fuzzy entropy values calculated from ten eye images included in the multifocus eye image sequence, from which it has been confirmed that the test result performed by selecting five eye images having a low fuzzy entropy in consideration of the processing speed of the system reflects focus changes of the eye images of the user very well and shows an excellent recognition performance.

Moreover, in step S330 of detecting the inner boundary S110 and the outer boundary S120 from the selected eye images using the Canny edge detection method and the bisection method, the inner boundary S110, in which the difference in the color tone between the pupil and the iris of the eye image photographed in black and white occurs largely, is readily extracted as depicted in FIG. 6; however, the boundary element between the iris and the sclera is hardly extracted as the difference in the color tone between them does not occur so much. Here, the iris area between the pupil and the sclera includes the area containing various patterns useful for the personal identification and the area containing little pattern at the same time.

Accordingly, the outer boundary S120 defined by a radius from the center of the pupil to the cornea reflected light between the sclera and the lower eyelid generated by the infrared light units 14 is detected, rather than extracting the boundary element between the iris and the sclera.

In step 340, the iris area between the inner boundary S110 and the outer boundary S120 extracted in the above step is divided to obtain an iris image in a rectangular shape by a polar coordinate transform and then a collarette boundary S130 is extracted using the histogram smoothing and the discrete Fourier transform.

In step 350, a normalized iris image S140 is generated from the iris image between the inner boundary S110 and the collarette boundary S130 including various patterns useful for the personal identification.

Figure 7:
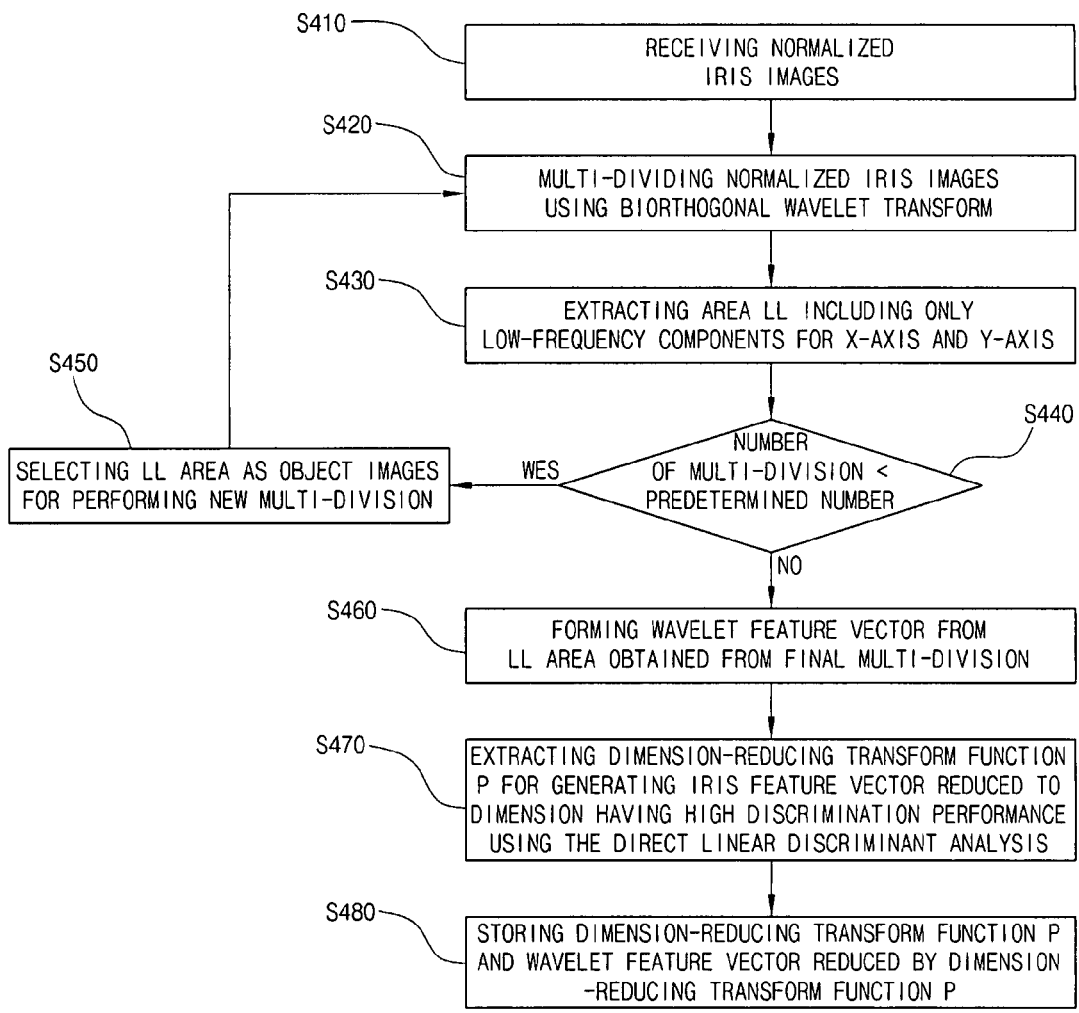
FIG. 7 is a flowchart illustrating a process of extracting a feature vector for the registration and a dimension-reducing transform function in a feature vector extraction step in accordance with the present invention.
Figure 8:
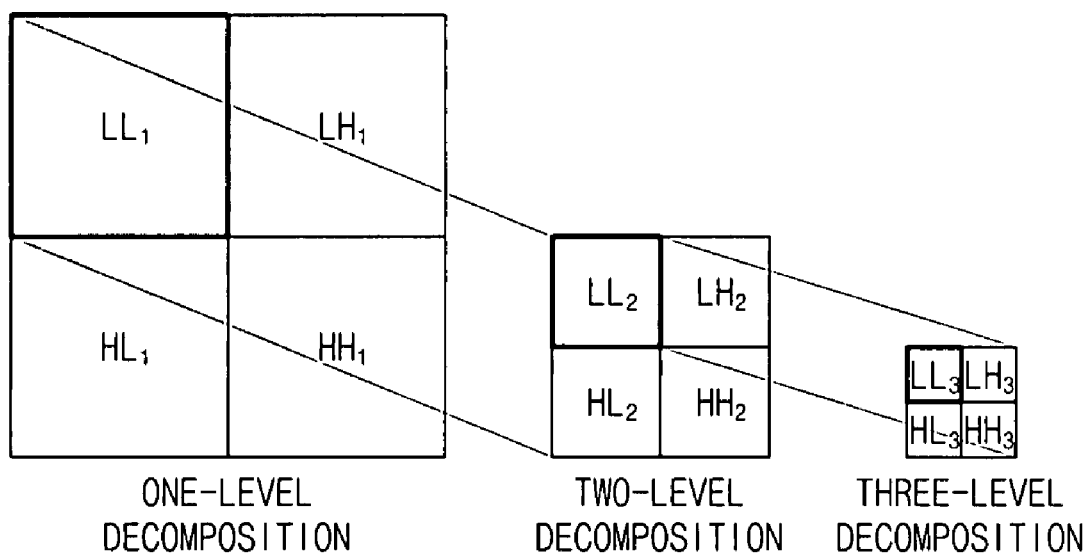
FIG. 8 is a diagram illustrating an example of a multi-division of an iris image for generating a wavelet feature vector using a biorthogonal wavelet transform in accordance with the present invention.

FIG. 7 is a flowchart illustrating a process of extracting a feature vector for the registration and a dimension-reducing transform function in a feature vector extraction step in accordance with the present invention, and FIG. 8 is a diagram illustrating an example of an iris image multi-divided for generating a wavelet feature vector using a biorthogonal wavelet transform.

As depicted in the figures, the feature vector extraction step (S400) comprises: a step (S410) of receiving a multifocus iris image sequence composed of normalized iris images extracted in the above image pretreatment step (S300); a step (S420) of multi-dividing the input multifocus iris image sequence using a biorthogonal wavelet transform; a step (S430) of extracting an area LL including only low-frequency components for the X-axis and the Y-axis among the subbands of the multi-divided iris images; a step (S440) of determining whether or not the number of the multi-division is greater than a predetermined number k; a step (S450) of selecting the area LL including only low-frequency components extracted in the above step (S430) as object images for performing a new multi-division, if the number of the multi-division is smaller than the predetermined number k in the above step (S430); a step (S460) of forming a wavelet feature vector from the area LL obtained by a final multi-division, if the number of the multi-division is greater than the predetermined number k in the above step (S430); a step (S470) of extracting a dimension-reducing transform function P for generating an iris feature vector reduced to a dimension having a high discrimination performance from the extracted wavelet feature vectors using the direct linear discriminant analysis; and a step (S480) of storing the dimension-reducing transform function P and the wavelet feature vector reduced by the dimension-reducing transform function P in the storage unit 70.

In the process of generating the feature vector for the iris recognition using the multifocus image sequence, it is necessary to generate the feature vector that shows a high discrimination performance, not affected by the image quality, reduces the storage capacity and, at the same time, reduces the processing time for the recognition.

In order to perform the multi-division to form the feature vector that is less influenced by the image quality, the present invention applies the biorthogonal wavelet transform, in which a symmetric filter having advantages in that there is no information transfer between the divided subbands and further it can be readily used in processing the boundary of the image is used. Moreover, in order to generate the feature vector that shows a high discrimination performance, reduces the storage capacity and, at the same time, reduces the processing time for the recognition, the present invention applies the direct linear discriminant analysis.

In step S420 of the multi-division applying the biorthogonal wavelet transform and in step S430 of extracting the area LL including only low-frequency components, as depicted in FIG. 8, the iris image normalized in the one-level decomposition is divided into four subbands: that is, $LL_1$ area denotes an image having only low-frequency components reduced to one-fourth from the original image; $LH_1$ area denotes an image having a form reduced to one-fourth and composed of horizontal components of the original image; $HL_1$ area denotes an image having a form reduced to one-fourth and composed of vertical components of the original image; and $HH_1$ area denotes an image composed of diagonal components of the original image and having a form reduced to one-fourth with only high-frequency components.

In such four subbands, $LL_1$, $LH_1$, $HL_1$, and $HH_1$, the $HH_1$ area is most sensitive to noise images, whereas, the $LL_1$ area is less sensitive to the noise images and has an excellent discrimination performance compared with the other subbands, in which the discrimination performance can be confirmed by calculating the following formula 3:

$$J(Su) = \frac{\text{trace}(D_b)}{\text{trace}(D_w)} \quad \text{[Formula 3]}$$

wherein J denotes a discrimination performance of a subband Su, $D_b$ and $D_w$ denote diagonal matrixes composed of eigenvalues obtained from a within-class scatter matrix and a between-class scatter matrix.

In step S440 of determining the number of the multi-division in FIG. 7, since the resolution of the image obtained in the present invention is 320×240, the designated number is limited to three times. The resolution of $LL_3$ area obtained in the three-level decomposition is 29×4 and is composed of feature data of 116 in total. Moreover, if the resolution of the original image is increased, it is necessary to increase the number of the multi-division by the wavelet.

As a result of examining the subbands multi-divided in the respective levels using the biorthogonal wavelet, the recognition rate is increased as the number of multi-division is increased, and the LL area including only low-frequency components shows the highest recognition rate among the subbands.

If the number of the multi-division is smaller than the designated number, the LL area including only low-frequency components is selected as an object image for performing a new multi-division in step S450. On the other hand, if the number of the multi-division is greater than the designated number, a wavelet feature vector is formed by reorganizing the respective pixel data in a vector form from the image of the LL area including only low-frequency components obtained in the multi-division of the final level in step S460.

In the present invention, a wavelet feature vector of 116 dimensions is formed from the $LL_3$ area.

In step S470, since all components of the wavelet feature vector extracted in step S460 are not composed of those having a discrimination performance sufficient for the personal identification and the dimension of the feature vector is large, a dimension-reducing transform function P for reducing the iris feature vector to a dimension having a high discrimination performance is generated using the direct linear discriminant analysis.

The direct linear discriminant analysis is directed to a method of removing a null space of the between-class scatter matrix including no significant data rather than a null space of the within-class scatter matrix including significant data having discrimination and is designed to solve the small sample size problem that the generally-known linear discriminant analysis has.

In step S480, the dimension-reducing transform function P generated in step S470 and the wavelet feature vector extracted in step S460 using the dimension-reducing transform function P are reduced to a dimension having a high discrimination performance and the reduced wavelet feature vector is stored.

Figure 9:
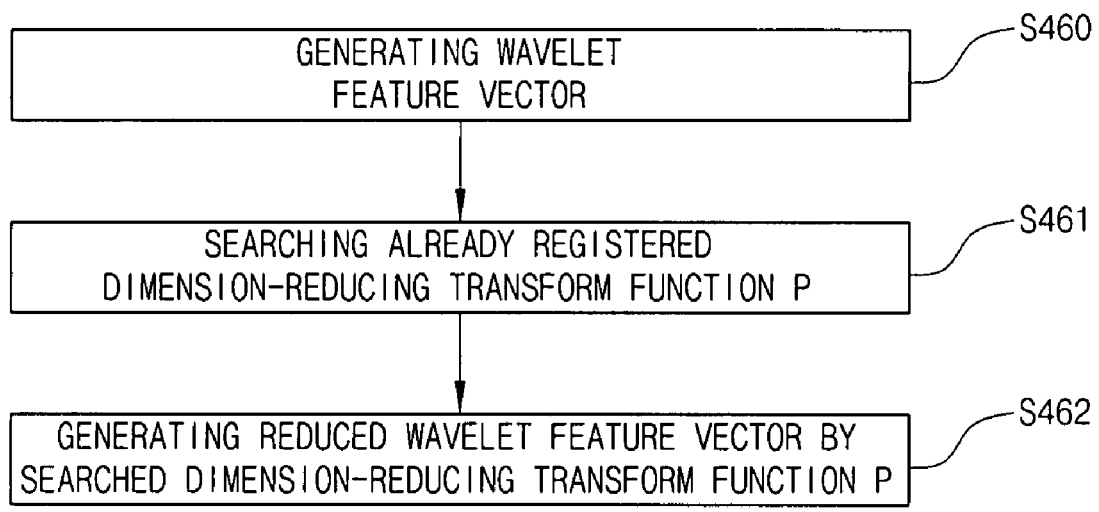
FIG. 9 is a flowchart illustrating a process of extracting the feature vector for the recognition in a feature vector extraction step in accordance with the present invention.

FIG. 9 is a flowchart illustrating a process of extracting the feature vector for the recognition in the feature vector extraction step in accordance with the present invention.

As depicted in the figure, the process of extracting the feature vector for the recognition comprises: a step (S460) of generating a wavelet feature vector; a step (S461) of searching the dimension-reducing transform function P registered in the storage unit 70; and a step (S462) of generating a reduced wavelet feature vector using the searched dimension-reducing transform function P.

Until the step (S460) of generating a wavelet feature vector in extracting the feature vector to be used in the recognition unit 50 for the user identification, the processes depicted in FIG. 7 are the same. In steps S461 and S462, the already registered dimension-reducing transform function P is searched and the reduced wavelet feature vector is generated using the wavelet feature vector extracted in step S460 and the dimension-reducing transform function P searched in step 461.

Figure 10:
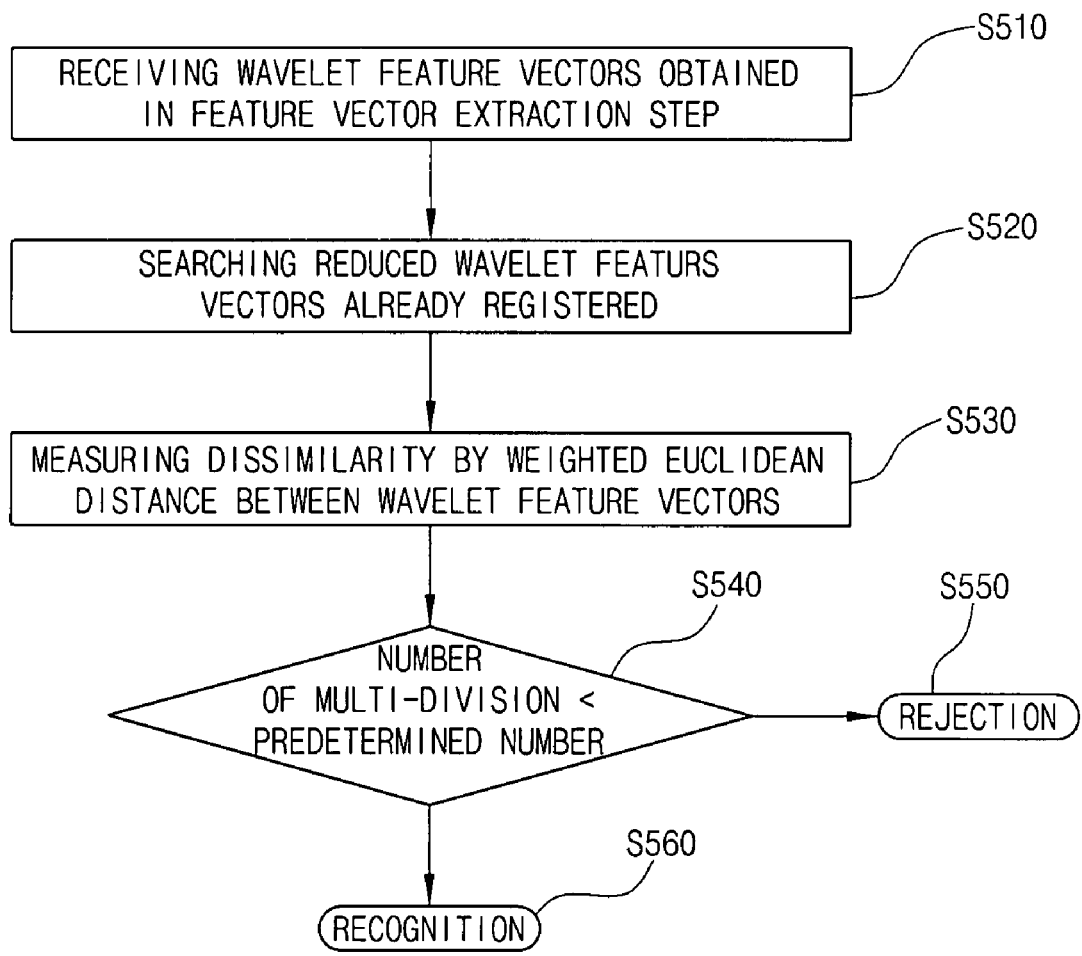
FIG. 10 is a flowchart illustrating a process of discriminating a user's authenticity by measuring the dissimilarity between the feature vectors in accordance with the present invention.

FIG. 10 is a flowchart illustrating a process of discriminating a user's authenticity by measuring the dissimilarity between the feature vectors in the process of performing the recognition.

As depicted in the figure, the process of discriminating the user's authenticity by measuring the dissimilarity between the feature vectors in the iris recognition system using the multifocus image sequence comprises: a step (S510) of receiving the reduced wavelet feature vectors obtained in the feature vector extraction step (S400); a step (S520) of searching the reduced wavelet feature vectors already registered; a step (S530) of measuring the dissimilarity $N_s$ by a weighted Euclidean distance between the wavelet feature vectors; a step (S540) of comparing the measured dissimilarity $N_s$ with a predetermined reference value; a step (S550) of rejecting the user, if the dissimilarity $N_s$ is greater than the predetermined reference value; and a step (S560) of recognizing the user, if the dissimilarity $N_s$ is smaller than the predetermined reference value.

In the process of discriminating the user's authenticity by measuring the dissimilarity between the feature vectors, in the case where step S510 receives the reduced wavelet feature vectors obtained from the multifocus image sequence in the feature vector extraction step S400, step S520 searches the reduced wavelet feature vectors stored in the storage unit 70, and step S530 measures the dissimilarity by the weighted Euclidean distance between the searched wavelet feature vectors and the input wavelet feature vectors, the dissimilarity is calculated as the following formula 4:

$$N_S(F, G^{(t)}) = \sqrt{\sum_i^m w_i^{(t)}(f_i - g_i^{(t)})^2},$$ [Formula 4]

$$w_i^{(t)} = \frac{1}{\sigma_i^{2(t)}}$$

wherein F and $G^{(t)}$ denote an input feature vector and an already registered feature vector pertaining to a class t, respectively, m denotes a dimension of the feature vector, $f_i$ and $g_i^{(t)}$ denote vector components corresponding to $i^{th}$ dimensions of the feature vectors F and $G^{(t)}$, respectively, $w_i^{(t)}$ denotes a weight corresponding to an $i^{th}$ dimension of the class t, and $\sigma i^{2(t)}$ denotes the dispersion of the components corresponding to the $i^{th}$ dimension of the class t.

Steps S540, S550 and S560 compare the dissimilarity $N_s$ obtained by applying a minimum distance classification rule to the weighted distance calculated in the above step with the predetermined reference value to determine the user's recognition and rejection.

As described above, according to the iris recognition system and method using a multifocus image sequence in accordance with the present invention, it is possible to reduce the time required for obtaining eye images since the eye images of various levels are obtained in sequence from an image obtaining apparatus by changing focuses at regular time intervals within a predetermined distance when receiving an eye image of a user. Moreover, it is also possible to recognize not only well focused images but also poorly focused images since eye images that can well reflect focus changes are selected and utilized using a fuzzy entropy.

Moreover, the iris recognition system and method using a multifocus image sequence in accordance with the present invention improves the processing efficiency and the recognition rate by extracting an iris image between the pupil and the collarette having various iris patterns and removing an unnecessary area using a Canny edge detection method, a bisection method and a discrete Fourier transform in the step of extracting the iris image from the user's eye image.

Furthermore, since the present invention uses a biorthogonal wavelet transform in which a symmetric filter is applied to the extracted iris image, it is possible to prevent the information transfer that may be caused between subbands during the multi-division of the iris image and form a wavelet feature vector that is less influenced by noise images using a subband corresponding to a low-frequency area among the multi-divided subbands.

In addition, it is possible to improve the recognition rate and provide a technique that can efficiently process, store, transmit and search the pattern information by reorganizing the feature vectors from the feature vectors obtained by the wavelet transform using a direct linear discriminant analysis to facilitate the personal identification and, at the same time, by reducing the dimension of the feature vector.

Moreover, the present invention provides a basic technique that can flexibly cope with the problems in various pattern recognition fields, other than the analysis of the iris pattern information, by providing a technique that can efficiently perform the recognition in terms of the processing performance and the processing time by measuring a weighted Euclidean distance that is easy to calculate parameters, not affected by simple and large values, in the process of comparing the learned feature vector and the input feature vector to generate a final result in the recognition unit.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. An iris recognition system using a multifocus image sequence comprising:
   an eye image input unit calculating the distance between an image obtaining apparatus and a user using a distance sensor to receive a multifocus eye image sequence having focus information of the user's eye varied at regular time intervals within a predetermined distance using the image obtaining apparatus;
   an eye image pretreatment unit calculating a fuzzy entropy for the multifocus eye image sequence input from the eye image input unit to select eye images of N number that can effectively express eye image data of various focusing levels, and extracting a multifocus iris image sequence by separating an iris image between pupil and collarette that has various iris patterns, from which an area unnecessary for configuring a feature vector is removed, from the selected eye images;
   a feature vector extraction unit multi-dividing the multifocus iris image sequence extracted in the eye image pretreatment unit, forming a wavelet feature vector from the multi-divided images using a subband including only a low-frequency area, and generating a wavelet feature vector reduced to a dimension having a high discrimination performance and a dimension-reducing transform function P;
   a recognition unit discriminating the user's authenticity by measuring a dissimilarity between the feature vector extracted from the feature vector extraction unit and a feature vector already registered;
   a register unit registering the reduced wavelet feature vector extracted from the feature vector extraction unit and the dimension-reducing transform function P in a storage unit; and
   a storage unit storing the dimension-reducing transform function P and the reduced wavelet feature vector.

2. The iris recognition system using a multifocus image sequence as recited in claim 1,
   wherein the image obtaining apparatus comprises:
   a CCD camera in which an infrared transmission filter and a macro lens are attached in front of a camera lens to ensure a recognizable iris pattern and to avoid losing iris image data due to noise images;
   an infrared light unit composed an infrared light emitting diode (LED) that irradiates light toward the front of the CCD camera; and
   a frame grabber converting analog signals of an eye image photographed by the CCD camera into digital signals.

3. An iris recognition method using a multifocus image sequence comprising:
   an image obtaining step (S200) of receiving a multifocus eye image sequence from an image obtaining apparatus;
   a pretreatment step (S300) of calculating a fuzzy entropy from the multifocus eye image sequence obtained from the image obtaining step (S200) to select eye images and extracting a multifocus iris image sequence by separating an iris image between pupil and collarette from the selected eye images;
   a feature vector extraction step (S400) of multi-dividing the multifocus iris image sequence extracted in the pretreatment step (S300), forming a wavelet feature vector from a subband including only low-frequency components among the multi-divided subbands, and extracting a reduced wavelet feature vector of an iris area for the personal identification from the wavelet feature vector thus formed using a dimension-reducing transform function P stored in a storage unit; and
   a recognition step (S500) of discriminating a user's authenticity by measuring a dissimilarity between the wavelet feature vector extracted in the feature vector extraction step (S400) and the feature vector registered in the storage unit.

4. The iris recognition method using a multifocus image sequence as recited in claim 3,
   wherein the pretreatment step (S300) comprises:
   a step (S310) of calculating a fuzzy entropy from the multifocus eye image sequence to select eye images that can effectively utilize eye image data of various focusing levels;
   a step (S320) of selecting eye images of N number having a low fuzzy entropy value from the calculated fuzzy entropy;
   a step (S330) of detecting an inner boundary and an outer boundary from the selected eye images;
   a step (S340) of detecting a collarette boundary for an iris area between the detected inner boundary and the outer boundary; and
   a step (S350) of generating a normalized iris image for the iris area between the detected inner boundary and the collarette boundary.

5. The iris recognition method using a multifocus image sequence as recited in claim 3,
   wherein the feature vector extraction step (S400) comprises:
   a step (S410) of receiving a multifocus iris image sequence composed of the normalized iris images extracted in the pretreatment step (S300);
   a step (S420) of multi-dividing the input multifocus iris image sequence using a biorthogonal wavelet transform;
   a step (S430) of extracting an area LL including only low-frequency components from the subbands of the multi-divided iris images;
   a step (S440) of determining whether or not the number of the multi-division is greater than a predetermined number;
   a step (S450) of selecting the area LL including only low-frequency components extracted in the above step (S430) as object images for performing a new multi-division, if the number of the multi-division is smaller than the predetermined number in the above step (S430);
   a step (S460) of forming a wavelet feature vector from the area LL obtained by a final multi-division, if the number of the multi-division is greater than the predetermined number in the above step (S430);
   a step (S470) of extracting a dimension-reducing transform function P for generating an iris feature vector reduced to a dimension having a high discrimination performance from the extracted wavelet feature vectors using a direct linear discriminant analysis; and
   a step (S480) of storing the dimension-reducing transform function P and the wavelet feature vector reduced by the dimension-reducing transform function P in the storage unit.

6. The iris recognition method using a multifocus image sequence as recited in claim 3 or 5,
   wherein the feature vector extraction step (S400) further comprises:
   a step of (S460) of generating a wavelet feature vector using a biorthogonal wavelet transform that applies a symmetric filter;
   a step (S461) of searching the dimension-reducing transform function P already registered so as to reduce the extracted wavelet feature vector to a dimension having a high discrimination performance; and a step (S462) of generating a reduced wavelet feature vector applying the wavelet feature vector to the searched dimension-reducing transform function P.

7. The iris recognition method using a multifocus image sequence as recited in claim 3, wherein the recognition step (S500) comprises:

a step (S510) of receiving the reduced wavelet feature vectors obtained in the feature vector extraction step (S400);

a step (S520) of searching the registered feature vectors to compare the input wavelet feature vectors with the already registered feature vectors;

a step (S530) of specifying a dissimilarity by a weighted Euclidean distance between the input wavelet feature vectors and the already registered in the feature vectors;

a step (S540) of comparing the measured dissimilarity with a predetermined reference value; and steps (S550 and S560) of rejecting and recognizing the user based on the compared results.

* * * * *